April 29, 1958 H. W. CAIN 2,832,830
CONTROL CIRCUITS FOR TELEPHONE ANSWERING
AND RECORDING DEVICES
Filed July 21, 1954
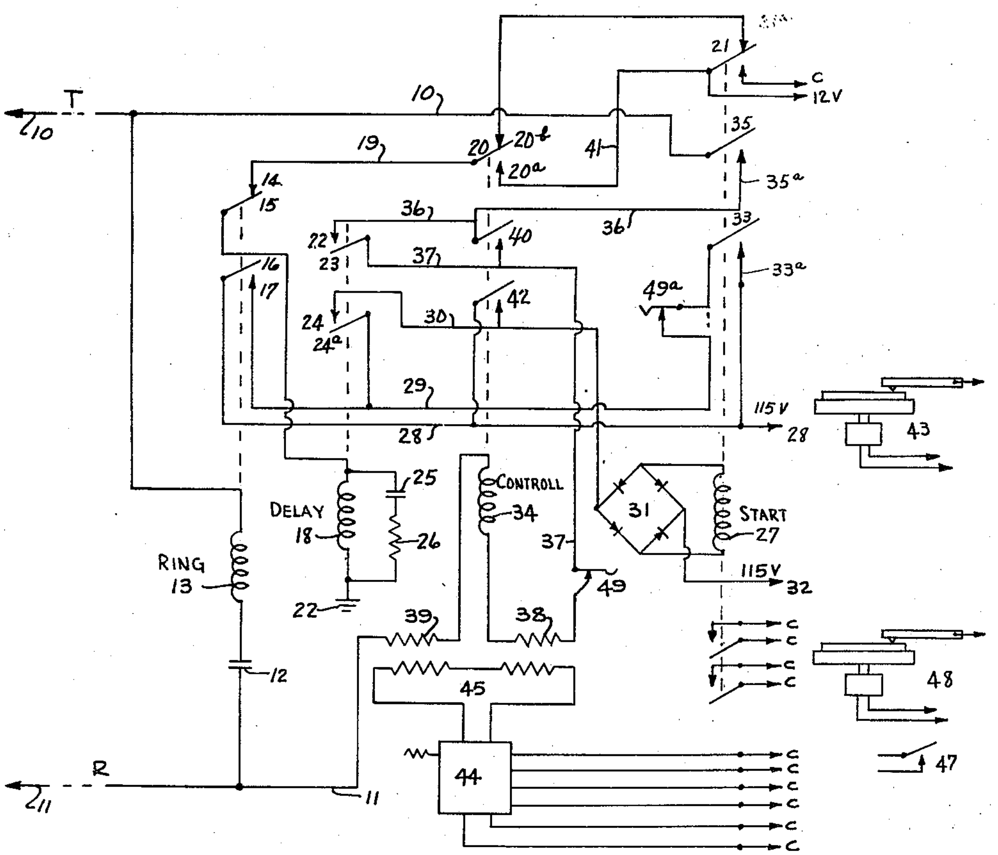
INVENTOR.
HARRY WILSON CAIN
BY
Van Deventer & Shively
ATTORNEYS

United States Patent Office 2,832,830

Patented Apr. 29, 1958

2,832,830

CONTROL CIRCUITS FOR TELEPHONE ANSWERING AND RECORDING DEVICES

Harry Wilson Cain, New York, N. Y.

Application July 21, 1954, Serial No. 444,697

9 Claims. (Cl. 179—6)

This invention relates to control circuits and apparatus for telephone answering and recording devices.

Telephone answering and recording devices of the type referred to herein are devices which when connected to a subscriber's telephone line or other communication circuit will automatically go into operation when a ringing signal is given and answer an incoming call by means of a record left in the device. After delivering said message to the calling party, the latter may record a message he wishes to leave, in the device, which then disconnects itself from the line circuit and awaits the next call. If desired, the device can be used for answering the telephone only, and in that case the incoming message recording feature is not used.

It will be understood that the invention herein disclosed is applicable to either the complete combination device which will answer incoming calls and record incoming messages, or a device which will answer incoming calls only.

Hereafter such devices, whether for answering and recording or answering only, will be termed Peatrophones, which is the trade name for a device for the class described now in extensive use throughout the United States.

An object is to provide an improved starting circuit for Peatrophones or similar devices.

Another object is to provide an improved disconnect circuit for use in Peatrophones or similar devices.

Other objects and advantages of the invention will more fully hereinafter appear, reference being made to the following specification and the accompanying drawing, Figure 1, wherein by way of illustration is shown the improved starting and disconnect circuits, together with a schematic drawing of a telephone answering and recording device, the circuits of said device being shown only sufficiently to enable the operation of the starting and disconnect circuits to be understood. This disclosure is therefore not illustrative of the invention as many changes can be made in the starting and disconnect circuits, as well as those pertaining to the answering device per se, without departing from the appended claims.

Referring to the sole figure, the telephone line circuit 10, 11 is assumed to be connected to a common battery central office switchboard having the usual apparatus for connecting the lines terminating therein.

*Ringing circuit*

Bridged across lines 10, 11 in series are the condenser 12 and the winding of the ring or signalling relay 13, this relay having the normally closed contacts 14, 15 and normally open contacts 16, 17.

The requirements for a satisfactory signaling circuit are that the relay 13 must respond to a current of not less than two milliamperes of ringing current but the relay must not close unless there is a steady ringing current of a minimum of .2 of a second but will always close at a maximum of .5 of a second. This arrangement is necessary to provide for the short rings sometimes experienced on manually operated switchboards and to prevent the machine from starting due to "strays" and "transients."

It is at once obvious that in order to meet the above requirements a delay circuit in the starting circuit is desirable, and this is provided by connecting the winding of a delay relay 18 to contact 15 and via normally closed contact 14 and conductor 19 to the normally closed contact 20 and via contact 21 to the 12 volt D. C. current supply, thus placing relay 18 in series with the 12 volt current via contacts **15, 14, 20, 20*b* and 21 on relay 27, one side of the 12 volt supply being shown as "grounded" at 22. Relay 18 is therefore normally energized and holds its contacts 22, 23 and 24 and 24*a* open. Upon operation of relay 13 by ringing current incoming over line 10, 11, contacts 14, 15 open, thereby opening the 12 volt D. C. circuit through relay 18. Relay 18 thereupon closes contacts 22, 23 and 24 and 24*a*, but these close slowly to afford the desired delay obtained by the bridged condenser 25 and resistance 26**.

To obtain the operating characteristics above set forth, and using ordinary telephone type relays, signaling relay 13 may have a D. C. resistance of 5,000 ohms and an impedance of approximately 150,000 ohms at 1,000 cycles; the delay relay 18 has a D. C. resistance of approximately 1,200 ohms; the condenser 25 is 50 mf. (15 volts) and the resistance 26 approximately 3,000 ohms D. C. Such a combination of elements will produce the delay effect previously described.

Contacts 16, 17 on relay 13 close as contacts 14, 15 open, thereby setting up a circuit from the A. C. power conductor 28 via contacts 16, 17 to conductor 29 to contact **24*a*** of the delay relay.

Upon closure of the contacts **24, 24*a* of relay 18, the winding of a starting relay 27 is energized by the 115 v. A. C. power circuit which may be traced from conductor 28 through contacts 24, 24*a*, conductor 30 through rectifier 31, winding of relay 27 to power conductor 32 and relay 27** is operated.

Relay 27 closes contacts **33, 33*a* connecting the A. C. power wire 28 to conductor 29 and via contact 24*a* to contact 24 and to conductor 30 and via rectifier 31 and relay 27 to the other side 32 of the power circuit. This locks relay 27 across the power circuit independently of contacts 16, 17 of relay 13, so that further pulsations of said relay due to application of ringing current will not affect relay 27, whose contacts may assume normal position without affecting the relays 18 and 27. The circuit through relay 18 is broken at the contacts 21 of relay 27 when the latter is operated. Thus the starting relay 27 once operated is independent of the further operation, if any, of relay 13 and its further operation is dependent upon the control or "drop out" relay 34** as presently described.

When relay 27 operates, it closes contacts **35, 35*a* thereby connecting line conductor 10 to conductor 36, to contacts 22, 23 (which are closed at this time) and via conductor 37 (via contact 49 if used) to the windings 38, 39 of a repeating coil 44 having in series therewith the winding of control relay 34 connected to line 11. It will be seen that now the line, the repeating coil windings 38, 39 and the winding of relay 34 are in series, so that the D. C. current normally flowing in all C. B. telephone lines will actuate relay 34**.

When relay 34 operates, it closes contacts 40, thereby completing the telephone line circuit through relay 34 independent of contacts 22, 23 of relay 18.

Contact 20 breaks from contact **20*b* and makes with contact 20A. A circuit can now be traced from the 12 volt power via conductor 41, contacts 20*a*, 20, conductor 19, contacts 14, 15 (closed at this time) and through winding of relay 18 to "ground" at 22. Relay 18** opens all its associated contacts.

Relay 34 also closes contacts 42, closing the holding circuit through relay 27 independently of contacts 24, **24*a* on relay 18**.

The device is now in answering position, and by apparatus in the telephone answering and recording device not shown herein, but connected to the control circuits C, the talk-out phonograph 43 is connected via amplifier 44 to the windings 45 of the repeating coil 46, and these windings being in inductive relationship to windings 38, 39 on said coil connected to the line circuit, the talk-out message on phonograph 43 will now be delivered to the calling party.

At the end of the talk-out message the mid-cycle shift device 47 is operated, and the circuits are shifted to "recording" position and connected to the recording phonograph 48, and the calling party records his message.

Upon the completion of the recording, the device, by timer means therein, may re-set itself. This is accomplished, for example, by a timer contact 49 operated by the recording mechanism to momentarily open the circuit through relay 34 which thereupon releases its contacts, and as the holding contact 42 for the starting relay 27 is opened by the release of relay 34, relay 27 restores to normal, resetting all circuits ready for the next incoming call.

For a complete operation of a typical Peatrophone circuit insofar as the mid-cycle shift from "talk-out" to "record" is concerned, reference may be made to U. S. Patents Nos. 2,673,241 and 2,673,242, dated March 23, 1954. The connections to the controls C are not herein shown and described in detail as they play no part in the control circuits herein described except to the extent noted.

The timer contact 49 is merely a safeguard, operating at the end of a predetermined period and may be omitted where it is desired to control the disconnection of the Peatrophone entirely by calling party.

*Disconnection of peatrophone under control of calling party*

The calling party has control of the Peatrophone at all times during its "talk-out" and "record" operations, so that when the calling party hangs up his receiver, thereby producing a break in the line circuit (or upon the disconnection of the Peatrophone line on the switchboard by an operator) relay 34 momentarily releases. This opens contact 40 thereon which opens the line circuit through relay 34.

Contact 42 opens thus opening the circuit through relay 27.

Contact 20 moves from **20*a* to 20*b***. The device is now reset to normal waiting position, ready for the next incoming call.

It will be noted that the control relay 34 and its contacts may be omitted when the device is used on magneto lines where there is no central office battery. In such cases the inside terminals of windings 38, 39, are connected together, and the timer contact **49*a* operating at the end of the recording cycle is employed instead of timer 49. As timer 49*a* opens momentarily, it opens the power circuit through starting relay 27, which releases its contacts resetting the device ready for the next incoming call. When relay 34 is omitted, conductor 19 connects directly to contact 21*a***.

What is claimed is:

1. In combination, a signaling relay having a winding and a pair of normally closed contacts and a pair of normally open contacts; a first circuit including said normally closed contacts, a source of power and the winding of a delay relay, said delay relay having a first pair of normally open contacts; a second circuit including said normally open contacts on said signaling relay, said first pair of contacts in said delay relay, a source of power and the winding of a starting relay, said starting relay having contacts; a second pair of normally open contacts on said delay relay; a third circuit including contacts on said starting relay, a telephone line circuit and said second pair of contacts on said delay relay; and means controlled by some of said contacts of said starting relay adapted upon the actuation of same to perform a plurality of functions including the opening of said first circuit and automatic answering of an incoming telephone call incoming on said telephone line circuit.

2. The combination as claimed in claim 1, including a repeating coil having a winding serially included in said third circuit.

3. The combination as claimed in claim 1, including a pair of normally open contacts on said starting relay connected in parallel with said first pair of normally open contacts in said signaling relay.

4. The combination as claimed in claim 1, wherein said source of power in said second circuit is alternating current, and said starting relay winding is connected thereto via a rectifier whereby said starting relay is operated by rectified alternating current.

5. The combination as claimed in claim 1, wherein said starting relay has a pair of normally open contacts in parallel with said normally open contacts of said signaling relay.

6. The combination as claimed in claim 1, wherein a pair of normally closed timer contacts adapted to be actuated by mechanism controlled by the conjoint operation of said three relays are serially included in said power circuit connected to said starting relay.

7. In combination, a signaling relay having a winding and a pair of normally closed contacts and a pair of normally open contacts; a first circuit including said normally closed contacts, a source of power and the winding of a delay relay, said delay relay having a first pair of normally open contacts; a second circuit including said normally open contacts on said signaling relay, said first pair of contacts in said delay relay, a source of power and the winding of a last relay, said starting relay having contacts; a second pair of normally open contacts on said delay relay; a third circuit including contacts on said starting relay, a telephone line circuit and said second pair of contacts on said delay relay; a control relay having a winding serially included in said third circuit, said control relay having a pair of normally open contacts connected to one of said normally open contacts of said signaling relay and one of said first pair of contacts in said delay relay whereby upon operation of said control relay the aforesaid contacts in said signaling and delay relays are rendered ineffective; and means controlled by some of said contacts of said starting relay adapted upon the actuation of same to perform a plurality of functions including the opening of said first circuit and automatic answering of an incoming telephone call incoming on said telephone line circuit.

8. In combination, a signaling relay having a winding and a pair of normally closed contacts and a pair of normally open contacts; a first circuit including said normally closed contacts, a source of power and the winding of a relay relay, said delay relay having a first pair of normally open contacts; a second circuit including said normally open contacts on said signaling relay, said first pair of contacts in said delay relay, a source of power and the winding of a last relay, said starting relay having contacts; a second pair of normally open contacts on said delay relay; a third circuit including contacts on said starting relay, a telephone line circuit and said second pair of contacts on said delay relay; a control relay having a winding serially included in said third circuit, said control relay having a pair of normally open contacts connected to said second pair of normally open contacts on said delay relay whereby said last contacts are rendered ineffective upon operation of said control relay, said control relay having a second pair of normally open contacts connected to one of said normally open contacts of said signaling relay and one of said first pair of contacts in said delay relay whereby upon operation of said control relay the aforesaid contacts in said signaling and delay relays are rendered ineffective; and means controlled by some of said contacts of said starting relay adapted upon the actuation of same to perform a plurality of functions including the opening of said first circuit and automatic answering of an incoming telephone call incoming on said telephone line circuit.

9. In combination with a telephone line circuit; a signaling relay connected to said circuit and responsive to incoming ringing current flowing therein, said relay having contacts; a starting relay having contacts; a circuit including said contacts on said signaling relay, said starting relay and a source of power; means in said last mentioned circuit for delaying the operation of said starting relay for a period after the operation of said signaling relay contacts; a control relay having contacts; a circuit including said line circuit, contacts on said starting relay and said control relay; means operated by said control relay whereby upon operation thereof said starting relay is restored to normal; and means controlled by the operation of said starting relay to perform a plurality of functions including automatic answering of an incoming call incoming over said telephone line circuit.

References Cited in the file of this patent

UNITED STATES PATENTS 2,673,241 Van Deventer et al. ------- Mar. 23, 1954